US008224696B2

United States Patent
Speiser et al.

(10) Patent No.: US 8,224,696 B2
(45) Date of Patent: Jul. 17, 2012

(54) AUTOMATED REWARD MANAGEMENT FOR NETWORK-BASED CONTESTS

(75) Inventors: Michael L. Speiser, Menlo Park, CA (US); Leonard Speiser, Redwood City, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1487 days.

(21) Appl. No.: 11/405,209

(22) Filed: Apr. 17, 2006

(65) Prior Publication Data

US 2007/0244749 A1  Oct. 18, 2007

(51) Int. Cl.
*G06Q 30/00* (2012.01)

(52) U.S. Cl. .................................................. 705/14.16

(58) Field of Classification Search ............ 705/10, 705/14, 26, 27; 463/25
See application file for complete search history.

(56) References Cited

U.S. PATENT DOCUMENTS

| | | | | |
|---|---|---|---|---|
| 4,216,967 A * | 8/1980 | Marse | ............................ | 273/257 |
| 4,682,778 A * | 7/1987 | Willis et al. | ..................... | 273/257 |
| 6,019,374 A * | 2/2000 | Breeding | ....................... | 273/292 |
| 6,224,486 B1 * | 5/2001 | Walker et al. | ................... | 463/42 |
| 6,299,534 B1 * | 10/2001 | Breeding et al. | ................ | 463/25 |
| 6,439,997 B1 * | 8/2002 | Brasseur et al. | ................ | 463/40 |
| 2001/0041616 A1 * | 11/2001 | Edwards et al. | ................. | 463/42 |
| 2002/0004424 A1 * | 1/2002 | Nelson et al. | .................... | 463/42 |
| 2002/0039923 A1 * | 4/2002 | Cannon et al. | ................... | 463/42 |
| 2002/0055379 A1 * | 5/2002 | Saidakovsky et al. | ............ | 463/9 |
| 2002/0198050 A1 * | 12/2002 | Patchen | .......................... | 463/40 |
| 2003/0013516 A1 * | 1/2003 | Walker et al. | ................... | 463/25 |

OTHER PUBLICATIONS http://www.ksolo.com/, home page, downloaded from the internet on Apr. 11, 2006, 1 page.
http://www.ePrize, "Our Business," downloaded from the internet on Apr. 14, 2006, 1 page.
http://www.worth1000.com, Frequently Asked Questions, downloaded from the internet on Apr. 14, 2006, pp. 1-33.
http://www.eprize.com, "Unique Agency.Unique Results.," downloaded from the internet on Apr. 14, 2006, 1 page.

* cited by examiner

*Primary Examiner* — Saba Dagnew
(74) *Attorney, Agent, or Firm* — Seth H. Ostrow; Ostrow Kaufman LLP

(57) ABSTRACT

A system for automated reward management for network-based contests includes one or more processors and memory coupled to the processors, where the memory stores program instructions executable by the processors to implement a contest manager. The contest manager is configured to collect an entry fee corresponding to each entry of a plurality of entries submitted for a contest over a network, and provide a prize to a winning entry of the contest based at least in part on a total amount of entry fees collected for the contest.

25 Claims, 9 Drawing Sheets

AUTOMATED REWARD MANAGEMENT FOR NETWORK-BASED CONTESTS

BACKGROUND OF THE INVENTION

1. Field of the Invention

This invention relates to computer systems and, more particularly, to services for creating and administering contests over computer networks such as the Internet.

2. Description of the Related Art

Skill-based contests, in which multiple contestants submit entries such as short stories, photographs etc., and in which winners are identified and awarded at the end of the contest, have been popular for generations. Traditionally, however, the establishment and administration of such contests has required considerable effort and time—e.g., the organizer has to set up the rules of the contest, publicize the contest, select judges or voters, receive the entries, provide the entries to the judges/voters, tally the results, notify the winners, etc., each of which often required the organizer to perform one or more manual actions. In addition, especially if the contest involves an entry fee or some level of monetary compensation, it has been the contest organizer's responsibility to determine whether any government regulations apply to the contest, and if so, to obtain any needed permissions from government authorities, and ensure that no applicable regulations are violated by the contest. As a result, setting up such contests has typically been an expensive and slow process that is usually beyond the capabilities of the average citizen.

In recent years, personal computers of ever-increasing computational power have become more and more affordable, and network connectivity and available bandwidth between computers has greatly increased with the advent of the Internet. The number and types of content sources accessible from home computers, and the types of content that can be created relatively easily and cheaply using home computers and equipment typically available in middle class households, have all proliferated. Videos created at home using inexpensive digital video recorders, Web-based logs or "blogs" and podcasts of audio material are just some examples of new types of content that can be created and distributed fairly easily. There has also been an increased interest in new types of entertainment involving competitions among non-professionals in which the winners are selected by the audience, such as the popular "American Idol" television program in the United States, and its many clones throughout the world. Despite the increasing networking and content creation capabilities available and the continued interest in competitions of skill, however, flexible, easy-to-use mechanisms for setting up and conducting skill-based contests have so far remained unavailable.

SUMMARY

Various embodiments of systems and methods for automated reward management in network-based contests are disclosed. According to one embodiment, a system includes one or more processors and memory coupled to the processors, where the memory stores program instructions executable by the processors to implement a contest manager. The contest manager is configured to collect an entry fee corresponding to each entry of a plurality of contest entries submitted over a network for a contest, and provide a prize to a winning entry of the contest based at least in part on a total amount of entry fees collected for the contest. For example, the contest may require an entry fee of $1 from each contestant in one implementation, and $10,000 may be collected from 10,000 contestants participating in the contest. Of the total of $10,000 collected in entry fees, $8000 may be distributed in the form of prizes to one or more contestants, while the remaining $2,000 may be retained as a service fee by a service provider responsible for the contest manager and/or distributed between an organizer/sponsor of the contest and the service provider. Entries and entry fees for the contest, as well as contest-defining rules and votes used in determining the results of the contest, all may be received by the contest manager over the Internet in one embodiment. The contest manager may thus be configured to automate the process of contest prize management, leading to a considerable reduction in the effort and costs associated with conducting skill-based contests.

In some embodiments, a prize awarded by the contest manager may comprise one or more non-monetary components. For example, a contestant may be awarded with free publicity, e.g., by prominently displaying an identification of the contestant on one or more web sites maintained by the contest manager, etc. In one embodiment, a reward may comprise a reduction or waiver of entry fees for subsequent contests. In one embodiment, the contest manager may collect a sponsorship amount from a corporate sponsor, and the sponsorship amount may be used as part of the reward pool: e.g., rewards may be distributed based on the sponsorship amount and/or entry fees. The sponsorship amount may be used to reduce or waive entry fees for a plurality of contestants—e.g., if a sponsor establishes a fund of $10,000 for a particular contest, the first 10,000 contestants registering for the contest may have their entrance fee waived, thus providing an incentive for contestants registering early for the contest.

According to another embodiment, a winning contestant, such as a video or audio content creator, a photographer, or a writer, may be rewarded by marketing one or more items created by the contestant that are for sale at an e-commerce engine or web site. The e-commerce engine may be maintained independently of a contest manager conducting the contest—i.e., a different organizational entity may be responsible for the contest manager than is responsible for the contest manager in some embodiments. The contest manager may provide links (e.g., web links) to the portion of the e-commerce engine's web site where content items, such as videos, compact discs, etc., produced by a winning contestant are accessible for sale, and may promote or advertise the content items on its own web site.

In some embodiments, a contest manager may be configured to support the creation of one or more virtual communities associated with a contestant or a contest. For example, the contest manager may implement a simple, easy to use interface for such activities as creating a web log or discussion group, providing comments (which may include written comments, audio comments, or even video comments) on a contest or a contestant, viewing or playing back the comments, etc.

In another embodiment, voters who have a successful track record in predicting contest results, such as voters who have voted for a winner of two or more contests, may be provided voter rewards by a contest manager. A voter reward may also comprise monetary and non-monetary components: e.g., in one embodiment, a voter reward may include increasing the "strength" of the voters subsequent votes for other contests, thus giving the voter a greater influence relative to the average voter, or providing publicity to the successful voter at a web site maintained by the contest manager. In some embodiments, aggregated demographic information may be provided to a sponsor or organizer of a contest managed by a contest manager, e.g., allowing the organizer to determine how the contest is being received by a target audience.

Figure 1:
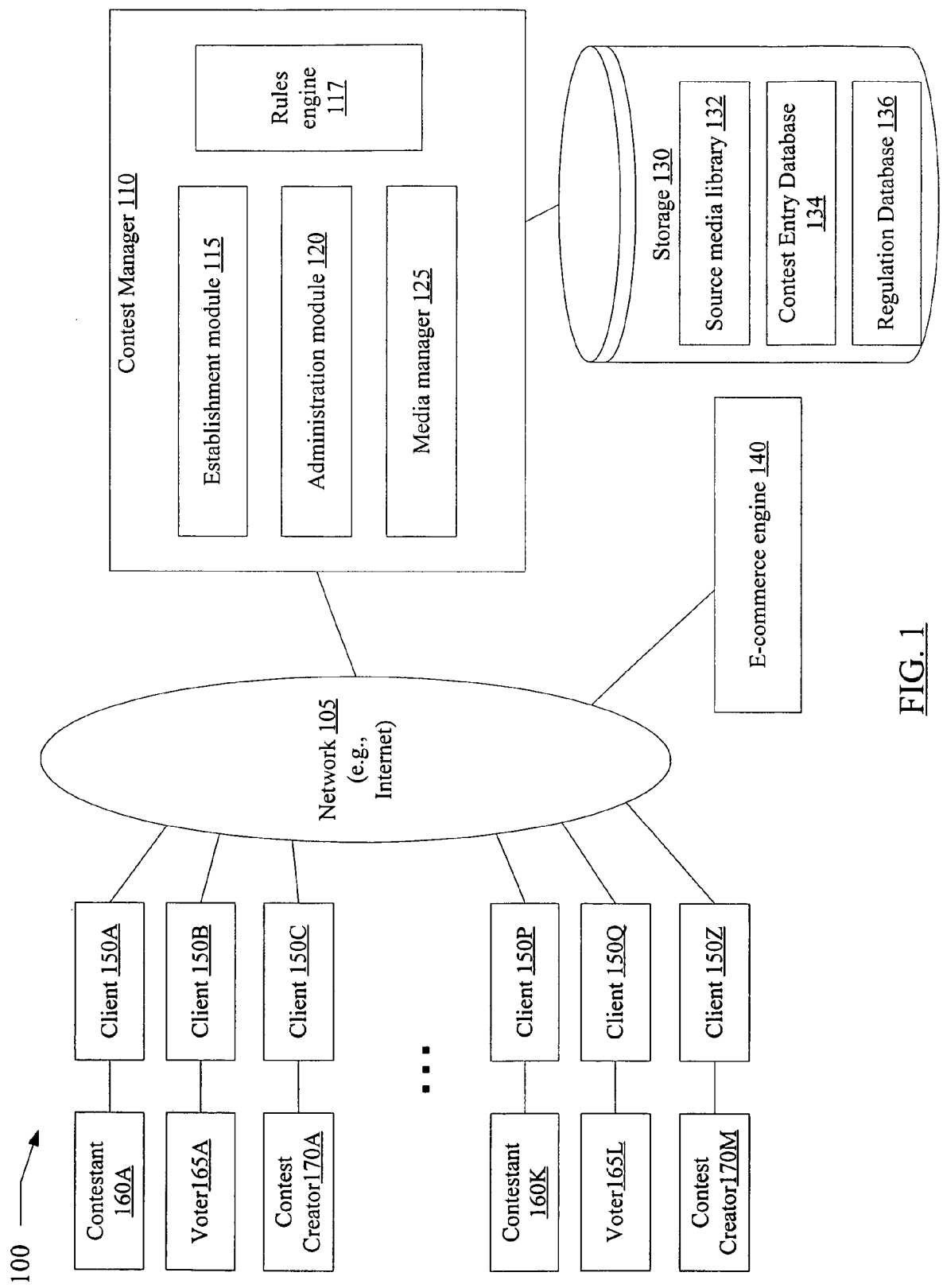
FIG. 1 illustrates a system according to one embodiment.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 is a block diagram illustrating a system 100 according to one embodiment. As shown, system 100 includes a contest manager 110 linked to a plurality of client devices 150 (e.g., devices 150A-150Z) via a network 105. An establishment module 115 of the contest manager 110 is configured to help contest creators 170, such as contest creators 170A and 170M at various client devices 150, establish skill-based contests easily and quickly, e.g., by submitting one or more requests via the network 105 (which may comprise portions of the Internet) that specify various parameters of the desired contests. The contests may allow contestants 160 (e.g., contestant 160A and contestant 160K) to participate in the contest by submitting their respective entries over the network 105. An administration module 120 of the contest manager may be configured to administer or conduct the contests. Administering the contests may include a wide variety of functionality in different embodiments, such as receiving contest submissions, checking the submissions for validity according to the contest rules (e.g., ensuring that a specified entry fee has been paid by a contestant), ensuring that no government regulations are violated during the contests, receiving votes on the submitted entries (e.g., votes submitted by voters 165 such as voters 165A and 165L from respective client devices 150), awarding prizes to contestants, etc. The contest manager 110 may thus make it possible for a contest creator located anywhere in the world to establish a contest for entries of a desired content type or based on a desired theme, potentially open to hundreds of thousands of contestants 160 and voters 165 (also located anywhere in the world) with very little effort and within a short amount of time (e.g., at most a few minutes in some embodiments). In some embodiments, rules governing the establishment and administration of the contests may be processed by a rules engine 117: for example, either or both of the establishment module 115 and the administration module 120 may be configured to use rules engine 117 to ensure that rules specific to the creation and conduct of each contest are being complied with, and/or that government regulations are not being violated by the establishment of the contest or by a submitted entry. In one embodiment, the contest manager 110 may be configured to obtain permission from a government agency or authority to establish and conduct contests of a specific type, e.g., in advance of receiving any requests to create such contests. For example, some jurisdictions may require permission for contests that may be considered to include gambling in some form.

In some embodiments, the contest may allow contestants 160 to submit various types of media objects, such as recorded audio or video files, as contest entries, which may be collected by media manager 125 and stored in storage 130. In one such embodiment, media manager 125 may be configured to assist the contestants 160 in preparing the contest entries, e.g., by providing media objects for the contestants to use or modify in creating their entries, and these media objects may also be stored in storage 130. For example, in a "lip sync" contest in which contest entries comprise videos of contestants 160 matching their lip movements to previously recorded music, the media manager may be configured to stream song lyrics to the contestants 160 at clients 150, and to collect and store the video entries created by the contestants. In addition to providing media objects to contestants 160 and receiving media contest entries, media manager 125 may also be configured to manage the distribution of one or more modules of executable software used to conduct the contests, such as upload tools, to client machines 150. An upload tool may, for example, be configured to automatically take over audio and/or video recording devices at the client machines, capture input provided by the contestants for submission as entries, and upload the entries back to media manager 125, without requiring the contestants 160 to perform complex technical tasks. It is noted that some contests may support group contestants in addition to or instead of individual contestants: e.g., a plurality of individual contestants 160 may jointly submit a single contest entry in such embodiments.

In one embodiment, storage 130 may comprise a plurality of logically and/or physically distinct databases, such as a contest entry database 134 for received contest entries, a source media library 132 comprising media objects such as videos or song lyrics to be provided to contestants for assistance in entry creation, regulation database 136 comprising contest rules and/or applicable government regulations, user databases containing information about contest creators 170, contestants 160 and/or voters 165, etc. In one implementation, the contest manager may be configured to update its database of applicable government regulations whenever a relevant law or rule changes, and may for example utilize the services of one or more legal service providers to automatically obtain notifications of relevant regulation changes. In one embodiment, the contest manager 110 may be configured to communicate with an e-commerce (electronic commerce) engine 140, e.g., to help market or sell content associated with a contest that was set up using the contest manager. For example, audio or video content that won a prize in a contest, or was created by or otherwise affiliated with a winner of a contest, may be sold through the e-commerce engine using a web link from a web page set up by the contest manager 110. The e-commerce engine may be independently managed and/or owned with respect to the contest manager in some embodiments: i.e., a different organization or corporation may be responsible for the contest manager 110 than the organization responsible for operating the e-commerce engine 140. In some embodiments, as noted above, network 105 may comprise a public network such as the Internet, while in other embodiments, contests may be created and conducted at least in part over private networks (such as corporate networks for contests limited to employees of a particular corporation.) Further details on various aspects of the operation of contest manager 110, such as the types and structures of contests allowed, the types of voting and prize systems that may be implemented, etc., are provided below. It is noted that although establishment module 115, administration module 120, rules engine 117 and media manager 125 are illustrated as separate entities in the embodiment shown in FIG. 1, the functionality of the contest manager 110 may be distributed among a different set of modules (or may be combined into a single module) in other embodiments; that is, any desired architecture may be used to implement the contest manager 110 in various embodiments.

Figure 2:
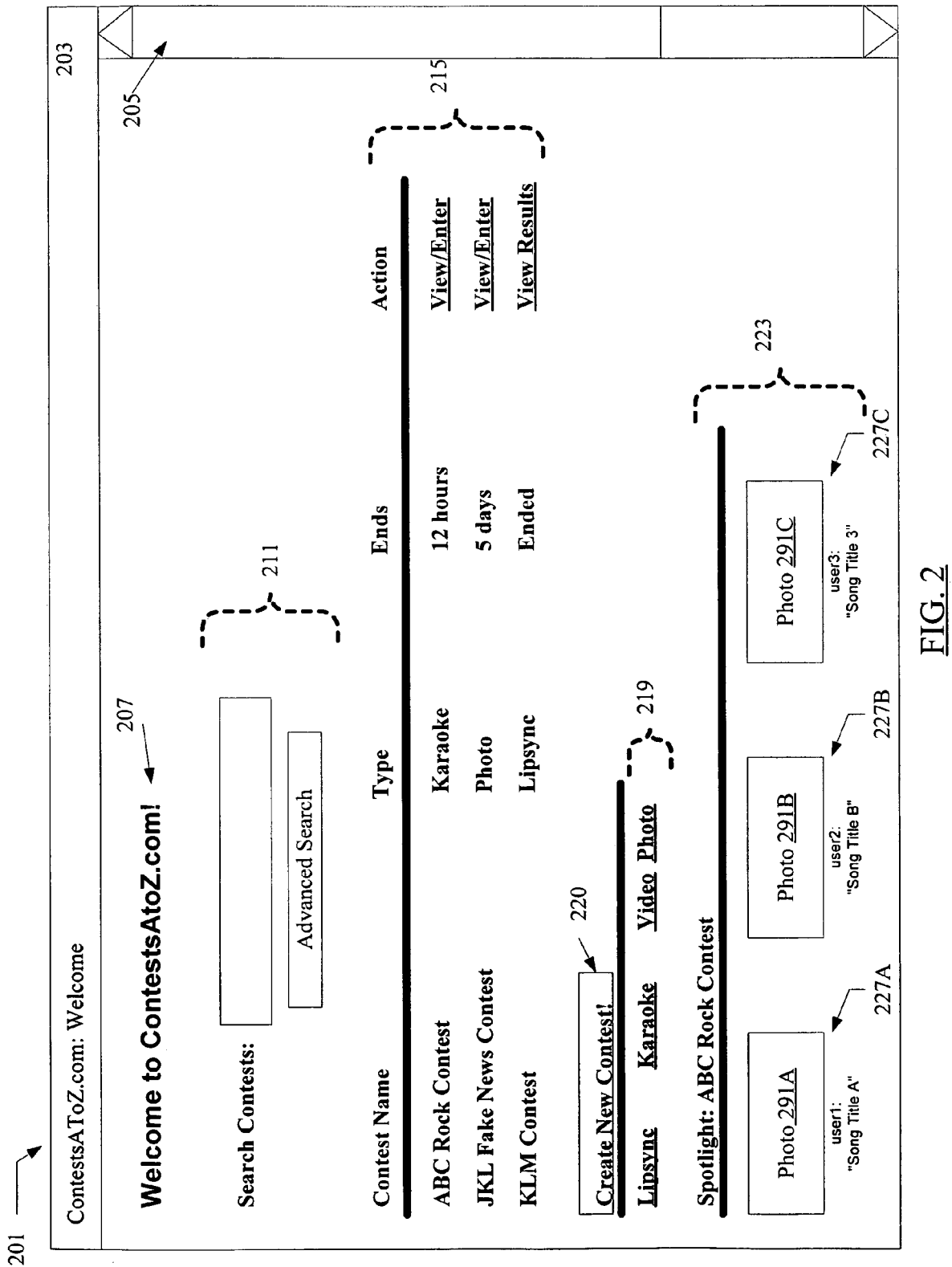
FIG. 2 illustrates a simple example of a web page that may be implemented as a home page for contest management services provided by a contest manager in one embodiment.

A number of interfaces, such as web pages accessible via browsers from clients 150, may be implemented for the various functions supported by the contest manager 110, such as contest creation, entry submission, viewing and judging, etc. FIG. 2 illustrates a simple example of a web page 201 that may be implemented as a home page or a "welcome" page for the contest management services provided by a contest manager 110 in one embodiment. As shown, the welcome page may include a title area 203, a scrollbar 205, and a welcome message 207 (e.g., "Welcome to ContestsAToZ.com"). The welcome message, which may be personalized in some implementations for returning visitors to the page (e.g., if a user has registered with a web site managed by the contest manager 110, the user's name may be displayed in the welcome message). In addition, as shown, the welcome page may include a search interface area 211 allowing the user to search for contests based on a variety of search criteria, for example based on contest name, contest content type (e.g., whether the contest entries are videos, photographs, etc.), contest creator, contest popularity, etc. An advanced search facility (as indicated by the button labeled "Advanced Search") may be implemented in some embodiments, e.g., to allow more complex search queries including Boolean combinations of search terms.

The web page 201 may also include a listing 215 of a selected number of contests. From among the set of contests managed by contest manager 110, which may include contests currently in progress, completed contests and/or contests scheduled to begin in the future, a subset may be selected for inclusion in listing 215 according to a variety of different criteria in various embodiments. For example, in one embodiment, the contests with the largest prizes or the largest sponsorship amounts may be displayed; in other embodiments, the contests that have so far attracted the most votes may be displayed, or those that are about to be completed in the near future may be displayed, and so on. The criteria used to select contests in listing 215 may be configurable in some embodiments, e.g., by a web site administrator of contest manager 110. For each contest listed in listing 215, various details may be displayed, such as the contest name (e.g., in the depicted "Contest Name" column), the contest entry type or theme (e.g., in the "Type" column), information about the contest duration or status (e.g., in the column labeled "Ends") and links to other web pages where a user may perform various actions with respect to the contest (e.g., in the Action column), such as viewing the entries or winners, submitting entries, etc.

In addition to the listing 215, the welcome page 201 may also include one or more interface elements (such as buttons, web links, etc.) configured to allow users to begin the process of creating contests of various types in some embodiments. In some embodiments, for example, by clicking on an embedded web link or button (such as button 220 titled "Create Your Own Contest" in FIG. 2), the user may obtain access to a generic contest creation web page, where contests for any desired type of entries may be created, as described below in conjunction with the description of FIG. 3. In an alternate embodiment, each of one or more elements 219 (such as the web links labeled "Lipsync", "Karaoke", "Video", and "Photo" in FIG. 2 indicating respective types of contest entries) may lead to other web pages where the user may be provided various options to create contests of the corresponding entry type, as described below in further detail. In one embodiment, selected entries of a "spotlighted" contest, such as entries 227A-227C, may also be displayed on the welcome page in spotlight region 223. Each entry 227 in the spotlight section may comprise, for example, a small photograph 291 (e.g., 291A-291C) or video of the contestant 160 who submitted the entry 227, the contestant's identifier or name (e.g., "user1", "user2", or "user3"), and information about the entry such as the name of the entry (e.g., "Song Title A"). The entries displayed in the spotlight section 223 may be selected based on a variety of different criteria in various embodiments: e.g., based on entry popularity, how recently the entry was submitted, etc. It is noted that while FIG. 2 shows a very simple example of an interface that may be provided as an entry point by contest manager 110 in one embodiment, more sophisticated interfaces (which may, for example, include animation, music, and other effects) may be implemented in other embodiments. It is also noted that in some embodiments, advertisements and/or contest-related promotional content, such as an identification of the most popular contest or contests, identifications of winning contestants 160, identifications of voters 165 with the most successful voting records, etc., as described below in further detail, may also be included in Welcome page 201 as well as in other web pages implemented by contest manager 110.

Scalability and Availability

The contest manager 110 may be configured to be scalable to support large numbers of concurrent contests, contest creators 170, contestants 160, voters 165 and other viewers (e.g., individuals who may wish to observe submitted contest entries or contest status without voting, competing or creating contests themselves) in one embodiment. For example, the contest manager 110 may be implemented using a cluster of computer servers and associated storage devices, and the functionality of the various components of the contest manager 110 may be distributed and/or replicated across the various computer servers of the cluster. Hundreds or thousands of concurrent contests may be managed in such embodiments, in which each contest includes tens of thousands or hundreds of thousands of participants (e.g., contestants 160, voters 165, and one or more contest creators 170) and viewers. In one implementation, the contest manager 110 may be geographically distributed: e.g., servers implementing the contest manager's functionality may be located in a plurality of data centers across a nation or across the world, which may help increase the resilience of the contest manager to natural disasters such as hurricanes, fires, etc., and may also help to distribute the workload experienced by the contest manager to prevent overloads that might overwhelm any single server. In some embodiments, subsets of the resources (e.g., a subset of the servers from a server farm and/or a subset of storage devices from a storage pool) may be dedicated to specific contests in response to reservation requests submitted as part of contest creation, as described below in further detail.

To provide a high level of availability, any of a variety of failover and/or redundancy techniques may be used for various components of the contest manager 110 and the storage 130: e.g., one or more storage arrays implementing a RAID (Redundant Array of Inexpensive Disks) technology may be used for storage, and computer servers configured as primary and failover backup servers may be used to implement the various modules of the contest manager 110. In some embodiments where a plurality of computer servers are used to implement contest manager 110, software or hardware load balancing mechanisms (e.g., a dedicated hardware load balancer) may be used to distribute the workload among the plurality of servers. It is noted that although FIG. 1 illustrates only one user (e.g., a contest creator 170, a contestant 160 or a contest voter 165) per client device 150, each client device 150 may support multiple users of each type (e.g., multiple contestants 160 may use the same client device 150) in some embodiments.

Contest Creation

Establishment module 115 may be configured to provide interfaces for contest creators 170 to specify a wide variety of parameters governing various aspects of the structure and rules of contests in various embodiments. For example, using a simple, web-based form-like interface for contest creation requests, contest creators 170 may specify parameters such as contest entry types and formats (e.g., whether entries for a particular contest are to consist of audio or video objects, photographs, written text, etc.), the duration and structure of the contest (e.g., whether the contest is to consist of one round or multiple rounds, the start and end date/time of a contest), the selection mechanism or procedure to be used to determine the winner or winners of the contest (such as aspects of various voting systems described below), the entry fee for contestants 160 (if any), whether the contest is to be limited to a specific group of contestants 160 (such as employees of a particular company or residents of a particular neighborhood, city or state) or open to the general public, and various techniques to be used for publicizing a contest, associating the contest with a sponsor or a brand, etc.

Figure 3:
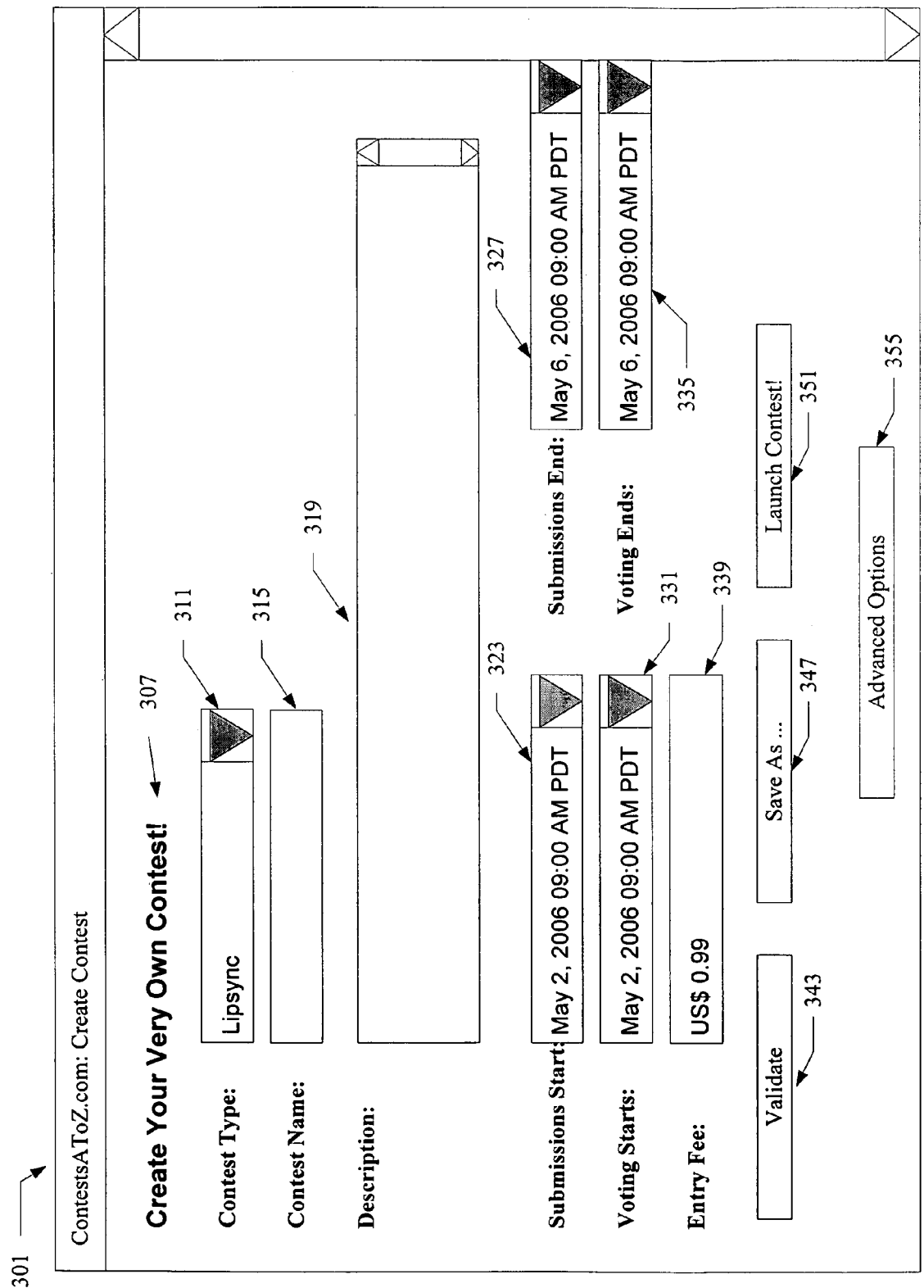
FIG. 3 illustrates a simple example of a web page that may be used for contest creation, according to one embodiment.

FIG. 3 illustrates a simple example of a web page 301 that may be used for contest creation, according to one embodiment. As shown, the web page 301 may comprise a welcome message 303, e.g., "Create Your Very Own Contest!", and an interface 311 (such as a drop-down menu) allowing the contest creator 170 to specify the type of entries to be submitted for the contest (e.g., lipsync video files, photographs, karaoke entries, etc.). The contest creator may specify the name of the contest, e.g., via text box 315, and may provide a description via text box 319. In some embodiment the description area or another similar interface element may be used by contest creators to specify rules for their contests—e.g., rules indicating who is allowed to submit entries, who is allowed to vote, etc. Dates and/or times at which contest submissions are to start and end may be specified via interface elements such as drop-down lists 323 (for submission start time) and 327 (for submission end time) in some embodiments. Dates and/or times at which voting for the entries is to start and end may be specified via similar interface elements 331 (for voting start) and 335 (for voting end). The time period during which entries are to be accepted may be termed an "entry submission period", and the time period during which votes are to be accepted may be termed a "voting period" herein, and the entry submission period for a given contest may differ from the voting period for that contest in some implementations. An entry fee may be specified via text box 339, and administration module 120 may be configured to verify during contest execution that each contestant has paid the specified entry fee. Contest creators 170 may be provided interfaces to validate their contest creation requests using an interface such as a button 343, e.g., to ensure that the contest specifications comply with contest creation rules set up by the contest manager 110 and/or with government regulations. Contest creators 170 may save their contests using an interface such as button 347—e.g., a persistent representation of the contest name, description, etc. may be saved in a contest database within storage 130.

In some embodiments, the establishment module 115 may provide contest creators 170 the capability to save contests as "drafts" in a manner similar to the way some electronic mail servers allow users to save mail messages in draft format. For example, a contest creator 170 may be provided a contest template with various elements to be filled out or customized, and the contest creator may save the template as a working draft from time to time as more details of the contest are filled in, without necessarily finalizing the contest before saving the draft version. The contest creator 170 may later retrieve the saved contest, e.g., either to modify it or to review it prior to sending it to contest manager 110. Button 351 may be provided to initiate the process of launching the contest—e.g., to submit a request for contest creation to establishment module 115. Advanced features of the contest creation interface, e.g., features specifying prize management options and fee management options for contests whose establishment requires fees, may be accessed via one or more other interface elements such as button 355 in some implementations. It is noted that while FIG. 3 illustrates a simple example of an interface that may be used to create contests, interfaces that may include additional features to those illustrated in FIG. 3, or modified versions of the elements shown in FIG. 3, may be used in other embodiments. In some embodiments, for example, the interface may provide users with default or suggested values for some of the contest parameters, or may provide a "wizard" interface, e.g., to help guide new contest creators who may not have a lot of experience in creating contests.

In one embodiment, as noted above, the rules engine 117 may be configured to store information (e.g., in a regulation database 136 within storage 130) on various government regulations that may be applicable to contests, and if a contest creator 170 sets up a contest that may be affected by one or more of the regulations, the establishment module 115 may be configured to provide a notification (such as an error message and/or a pointer such as a web link to information explaining the impact of the law) to the contest creator 170 indicating that the regulations prohibit the contest. If a contest creator 170 attempts to set up a contest that violates a regulation, the establishment module may prevent the contest creator from successfully completing the contest creation process—i.e., illegal or potentially illegal contests may be identified and prevented before any illegal activity can occur. For example, in one implementation, if a proposed contest is to allows minors under the age of eighteen years to participate as contestants for a monetary prize, and at least one country or state from which the contest is to be accessible has a law barring participation of minors in such contests, the rule engine 117 and the establishment module 115 together may prevent a contest creator from setting up such a contest or allowing entries to be submitted from jurisdictions where the contest is illegal. It is noted that in some embodiments, contest manager 110 may be configured to verify compliance with government regulations both during contest creation and during contest execution: e.g. establishment module 115 may be configured to ensure that no regulations are violated when a contest is created, and administration module may be configured to ensure that no regulations are violated during entry submission, voting, prize or award distribution, etc. For example, decency regulations prohibiting the display of certain types of media objects may be applicable during contest execution in some jurisdictions. In some embodiments, different regulations may apply during contest creation and contest execution; in other embodiments, an overlapping set of regulations may apply to both contest creation and contest execution/administration. To verify regulation compliance, in one embodiment the contest manager 110 may be configured to determine the geographical location (and hence the relevant laws/regulations that apply, which may differ for different locations) of a contest creator 170, contestant 160 or voter 165: e.g., either based on address information provided voluntarily by the contest creator, contestant or voter, or based on other information such as a mapping between a network address of the client system 150 being used and a geographical location. In one embodiment, the contest manager 110 may be configured to obtain pre-approval from relevant government agency for various types of contests, e.g., by filing one or more appropriate documents or forms, so that delays between receiving a contest creation request and the establishment of the contest may be minimized. In some embodiments, instead of or in addition to obtaining pre-approval, the contest manager may be configured to expedite the process of obtaining approval from a relevant government agency after a contest creation request is received—e.g., one or more approval forms may be fully or mostly filled in by the contest manager based on its knowledge of the contest creator and/or based on information provided in the contest creation request.

In some embodiments and for certain types of contests, contest creators 160 may have to deposit a specified amount of money, e.g., via a credit card or via an Internet-based payment facility such as PayPal™, prior to being allowed to start a contest. For example, some contests may require a contest creation fee. Other contests, such as some contests sponsored by business entities such as corporations (e.g., contests in which numerous and/or large monetary or in-kind prizes are to be awarded), may also or instead require the contest creator 170 (e.g., acting on behalf of the business entity) to provide a specified level of funding before a contest is started. At least a portion of the sponsor's funds may be used for prizes awarded to winning contestants, and other portions may be provided as payment to an owner or manager of contest manager 110. In some embodiments, the contest manager 110 may implement a flexible funding mechanism: for example, instead of requiring a fixed prize amount (such as $10,000) to be deposited before a contest begins, the total prize amount that the contest creator (e.g., a corporate sponsor) has to pay may be determined based on the total number of contest entries received during a specified entry submission period (e.g., $2 per entry). In embodiments employing such flexible funding, if a particular contest does not attract many contestants, the sponsor may avoid paying a large up-front contest creation fee. In one embodiments, to attract contestants 160, the entry fees for the first N contestants may be waived, e.g., based on a sponsorship amount received from a sponsor.

In some embodiments, contest manager 110 may provide contest creators 170 easy-to-use interfaces to promote their contests by contest manager 110. For example, contest creators may be allowed, using a simple form-like interface, to advertise their contests on one or more web pages managed by the contest manager such as Welcome page 201, on external web pages and web sites such as search engines (e.g., Google™), or on other media such as radio, television, newspapers, etc. The contest manager 110 may be configured to make the process of designing and distributing contest advertisements easy for non-professionals, e.g., by providing advertising templates and preview/editing options. In some embodiments, the contest manager 110 may also provide tools allowing contest creators 170 to track participation levels in contests they have created. For example, contest manager 110 may provide a contest creator 170 with an indication of how many contestants 160 and/or voters 165 are participating in a contest, the geographical locations of the voters, and/or other demographic information such as participant age distribution (e.g., how many of the participants are in the 20-40 years age group), gender distribution, etc. The contest manager 110 may gather such demographic information from contestants 160 and voters 165, e.g., as a registration requirement or a condition of contest participation in some embodiments. The demographic information may be presented in an aggregate and anonymized form (i.e., in a form where identification information such as names, full addresses, etc., of the contestants and/or voters is removed) to contest creators 170 in some embodiments to avoid privacy violations, and contestants and voters may be permitted to restrict or disallow the use of their demographic information (e.g., using an "opt out" interface) in some embodiments. In some embodiments, the demographic information may be provided in real time: e.g., as additional contest entries and/or votes are received, demographic information made available to a contest creator or sponsor may be updated dynamically.

In one embodiment, the contest manager 110 may be configured to reserve a specified set of computing, networking and/or storage resources for specific contests at contest creation time. For example, the contest manager may control, or have access to, a data center or web farm with a plurality of computer servers, storage devices, etc., from which specific subsets of servers and storage may be allocated and reserved for respective contests. Contest creators 170 that anticipate large numbers of contestants, voters or viewers may request, as part of the contest creation process, that sufficient quantities of computing, storage and networking resources be reserved for and dedicated to their contests. In some embodiments, contest manager 110 may include a monitoring module configured to track resource usage (such as CPU utilization, storage utilization, bandwidth utilization, etc.), either specific to a contest or for a collection of contests. The monitoring module may, for example, determine whether resource utilization has reached a threshold value that requires additional resources to be deployed, and may either automatically deploy additional resources when needed, or notify an administrator that additional resources are needed for the contest or the collection of contests. In some embodiments, e.g., for especially complex contests, or for contests that are to be run on a very large scale and so have special requirements, contest manager 115 may provide information allowing contest creators 170 to contact contest experts—e.g., a link to a professional services organization with expertise in large-scale web-based contests may be provided.

Establishment module 115 may support the creation of "branded" contests in some embodiments—for example, a business entity such as a corporation sponsoring a contest may wish to apply a brand-specific "look and feel" to the contest, such as a display of a corporate logo on every web page corresponding to the contest. In some embodiments, the establishment module may allow contest creators to upload specifications (e.g., using CSS (cascading style sheets), HTML (Hyper Text Markup Language), JSP (Java Server Pages) or some other web page presentation technology) to be used to customize the presentation of contests. In one embodiment, the establishment module may provide application programming interfaces (APIs) or programming guidelines/examples to technically proficient contest creators, allowing some contest creators to submit programming code that can be used to set up and conduct their contests.

Contest Structure

As noted above, a contest creator 170 may specify contest structure as part of a communication or request to the establishment agent 115. The term "contest structure", as used herein, may refer to information describing the time periods during which entries may be submitted and/or judged, and/or on the number and characteristics of rounds or sub-contests into which a contest may be organized (e.g., the manner in which entries are selected for inclusion in subsequent rounds of a multi-round contest, etc.). Contest manager 110 may be configured to support a wide variety of contest structures in various embodiments. In one exemplary contest structure, as shown in FIG. 3 above, a start time and an end time may be specified for a contest, indicating both the period in which entries can be submitted and the period in which voting or judging occurs: that is, as soon as an entry is received from a contestant 160 and made viewable to voters 165 in such a contest, voters 165 may begin voting on the entry. (It is noted that the terms "start time" and "end time" may refer to calendar dates as well as times within a day and time zone information: e.g., a "start time" or an "end time" may be specified as "Feb. 1, 2006, 10:00 am Pacific Standard Time".) At the end time, a winner or a ranked list of the highest-rated competitors may be determined based on the votes received. In this first example, the contest comprises a single round. In another example of a single-round contest structure, different start and end times may be specified for entry submissions and for voting, e.g., using interface elements 323, 327, 331, and 335 of FIG. 3. For example, submissions may be permitted between "Mar. 1, 2006, 9:00 am Eastern Standard Time" (submission start time) and "Mar. 4, 2006, 11:00 pm Eastern Standard Time" (submission end time), while voting may be permitted between "Mar. 5, 2006, 9:00 am Eastern Standard Time" (voting start time) and "Mar. 8, 2006, 11:00 pm Eastern Standard Time" (voting end time). The voting period may overlap at least partly with the submission period in some contests, and may be entirely separate from the submission period in other contests. In some embodiments, the total number of participants may be limited, e.g., a contest creation request may specify that only the first 1000 participants to register for a contest are to be allowed to compete. In other embodiments, other participation criteria may be specified in a contest creation request: e.g., only the employees of a particular corporation, or only those affiliated with a particular organization such as a club may be allowed to participate. Alternatively, in some embodiments, the contest creation request may specify participant exclusion criteria: e.g., employees at one or more levels of an organization sponsoring a contest may be barred from entering the contest.

In one example of a multi-round contest, submission and voting periods may be specified for each round, and a specified number of the best-performing contestants 160 (i.e., the contestants that receive the highest number of votes) may be automatically entered into the next round. For example, starting with 10,000 contestants in Round 1, the top 10% (1000) contestants may be entered into Round 2. A different voting period may be specified for each round, and a percentage of the most highly ranked contestants may be promoted in each round to the next round, without requiring any new entries to be submitted. The percentage of surviving contestants 160 may vary from round to round, e.g., based on parameters specified during contest creation. After several rounds (depending for example on the number of initial participants, or on a limit on the number of rounds specified during contest creation), a single winner or a small set of the highest ranked remaining contestants may be awarded prizes according prize policy in use. In a second variation of the multi-round contest structure described above, contestants 160 that survive from one round to the next may be required to submit new entries, e.g., within a specified submission period for each round. A variety of other contest structures may also be implemented in some embodiments: for example, in one scenario of a multi-round contest, a certain percentage of the most highly ranked "losing" contestants in each round may be allowed to modify their entries and resubmit them for the next round.

Content Types and Themes

Contest manager 110 may be configured to support contests for a wide variety of content types in various embodiments. For example, a particular contest may be limited to entries that combine video with audio, entries that consist of audio alone, video alone (e.g., "silent" video), still images, text, or a combination of any desired media object types that can be submitted over a network such as the Internet. More detailed content type specifications may be indicated during contest creation in some embodiments: e.g., in one implementation, a contest may be limited to videos of no longer than five minutes duration, or the file size of photography entries may be limited. Administration module 120 may be configured to verify, before including an entry in a contest, that the entry is of the correct content type and meets any required content type specifications in some embodiments, and may for example reject entries that fail to meet the desired specifications or are of an unexpected content type. A given contest may allow entries of different media types to be entered in some embodiments: e.g., a contest entitled "Tribute To War Heroes" may allow videos, audio, photographs, poetry, commentary, fiction, etc. to be submitted as entries. In some embodiments, contests may even be conducted for media types that cannot directly be submitted over a network (e.g., sculptures), as long as enough information can be provided over the network (e.g., a series of photographs of a sculpture) for voters or judges to rank entries relative to one another. In one embodiment, a contest entry may include a puzzle or a game (e.g., a video game or a board game).

A number of different contest types corresponding to different themes or categories may be supported in various embodiments. For example, song-related contests in various embodiments may allow users to submit "karaoke" entries (in which amateur singer contestants 160 sing along to lyrics of a song while the lyrics of the song are displayed and the original singers' voices are muted or reduced in volume), "lip sync" entries (in which contestants match their lip movements to previously recorded music), and/or "a capella" entries (in which contestants sing without accompanying musical instruments). In some embodiments, contest entries may include audio files such as "podcasts" that combine music with non-musical content such as news or mock news, commentary, storytelling, etc. or that consist entirely of non-musical content. Comedy-related contests may allow contestants to submit videos or audios of stand-up comedy (i.e., recordings of the contestant telling jokes or comedy routines before a live audience), so-called "bloopers" (recordings of an individual or group making an error, e.g., misreading a line in a play or motion picture, where the error generates humor), practical jokes, etc. In some embodiments, contest manager 110 may support the creation and execution of beauty-related contests, such as beauty pageants, "best make-up" or "best makeover" awards. In one embodiment, contest manager 110 may support the establishment and execution of a "dating" contest, in which, for example, contestants 160 are allowed to provide entries containing information about themselves, to compete for the opportunity to have a social interaction or "date" with an individual (e.g., the contest creator) based on the votes of viewers of the entries. A dating contest with an entry fee for each entry submitted may be run, for example, on behalf of a celebrity to raise money for a favorite charitable organization.

A variety of text-related contests may be organized using contest manager 110 in different embodiments, such as fiction contests, non-fiction contests, short story contests, poetry contests, web log (blog) contests, interview contests, etc. Still image related contests may include photography contests (including contests for original photographs as well as contests for modifications or distortions of existing photographs), illustration (e.g., manual drawing or computer-assisted drawing) contests, painting contests, collage contests, contests associated with the use of a particular technology or software program (such as Photoshop) to modify existing media objects, etc. Within a particular category, contests specializing in specific sub-genres may be set up in some embodiments: for example, within the general category of photography-related contests, specific contests limited to photographs taken over a mobile phone, or photographs taken using a particular brand of camera, may be established and managed by users with the help of contest manager 110.

The media types and/or themes for a given contest may be specified in contest creation requests, e.g., using a form-like web interface similar to that illustrated in FIG. 3, in some embodiments. In some embodiments, media manager 125 may be configured to provide media objects (such as song lyrics for karaoke contests, music videos for lip sync contests, or original photographs for photograph modification contests) and/or software components to assist contestants 160 in the preparation of their contest entries. In addition, as described below in further detail, in some embodiments, media manager may be configured to synchronize various elements (e.g., synchronize audio captured at a client system 150 from a contestant with video provided by the contest manager by adjusting the relative timing of the audio and the video) of contest entries, and/or to help improve the quality of contest entries (e.g., by digitally enhancing a video that may have been taken using an inexpensive or unsophisticated video camera).

Voting Systems

Administration module 120 may be configured to support a variety of different selection mechanisms for ranking contest entries and determining contest winners in various embodiments. A contest creator 170 may specify, e.g., at the time a contest creation request is submitted, a population of users or voters 165 who are to be allowed to vote for entries of a given contest. By default (e.g., if a contest creator does not specify voter qualification criteria), any visitor or viewer of a contest entry (with the exception of the contest creator 170 and contestants 160 competing in the contest) may be allowed to vote for the entries of a contest in one embodiment. A contest creator may limit the population of voters for a variety of reasons in different embodiments: e.g., based on the subject matter or theme of the contest (e.g., in a contest for "Best Casual-Friday Office Attire" at a particular corporation, only employees of the corporation may be allowed to vote), for promotional/funding reasons (e.g., in a contest to select the funniest answering machine message, only customers of a particular telecommunications company that is sponsoring the contest may be allowed to vote), etc.

In addition to specifying a population of voters, a number of other details regarding the specific voting or judging techniques to be used for a contest may be specified as part of a contest creation process in various embodiments. For example, in some embodiments, the contest creator may specify that each vote is to consist of a simple binary choice such as a "thumbs up" choice indicating approval of an entry and a "thumbs down" choice indicating disapproval, and that the entry with the most approval votes cast is to be selected as the winning entry. In other implementations, voters may be allowed to provide a rating on a scale (e.g., a rating on a scale of "1" to "5", where "1" signifies the best rating and "5" is the worst rating), or to provide multiple ratings based on different aspects or evaluation criteria for an entry (e.g., in a song entry, one rating may be provided for strength of voice, another for voice range, etc.). In some embodiments, voters may be required to rank various entries (e.g., to indicate an ordering from "best entry" to "worst entry", or to indicate the relative ranking of the top five entries they select). In. one embodiment, contest winners may be determined by elimination: e.g., votes may be used to eliminate remaining entries one by one until only a winner or a specified number of winners remain. In one implementation, each voter 165 may be allowed to cast multiple votes per entry for a contest: e.g., a given voter 165 may be allowed a total of ten votes, to be distributed as the voter chooses among up to ten contest entries. In addition to votes, in some embodiments voters 165 may be allowed to provide comments on entries or candidates, e.g., either written comments, audio comments, or video comments, and the comments may be stored and made available for view or playback by other viewers, voters and contestants by the contest manager.

In some embodiments, in addition to or instead of using votes submitted by voters 165 to determine contest results, a panel of experts may be selected to participate in the process of selecting the winners of a contest. In one scenario, well-known film experts, photographers or authors may be requested to participate in selecting a winner from a subset of contestants 160 that have received the most votes from viewers: for example, out of 10,000 submitted photography entries, the top 10 vote-getters may be reviewed by a panel of expert photographers to determine the final rankings. The expert panel may also participate over the network using one or more interfaces supported by contest manager 110 in one embodiment: i.e., the experts may not be required to gather in one location to make their decision, but may do so electronically, e.g., using an electronic voting process within the group of experts. Combining the use of panels with well-known experts with public voting (i.e., voting by non-expert voters 165) in this manner may help to engender additional publicity for contests conducted via contest manager 110 in such embodiments.

Figure 4:
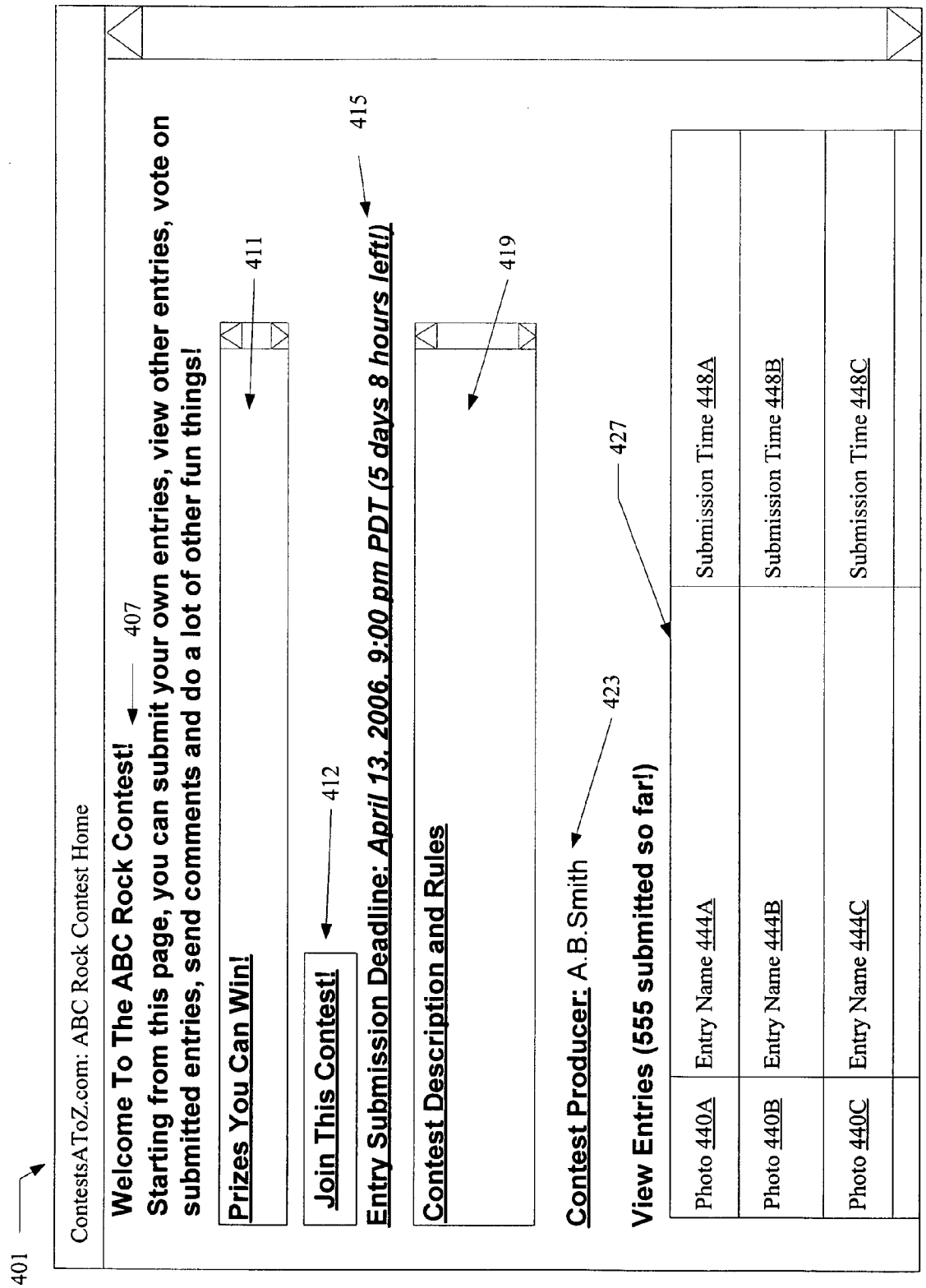
FIG. 4 illustrates an example of a simple contest home page that may be provided by an administration module of a contest manager, according to one embodiment.

In one embodiment, a potential voter 165 or contestant 160 (e.g., a viewer who has not yet decided whether to compete or vote in a contest) may navigate through one or more web pages (in addition to the Welcome page illustrated in FIG. 2) to view more information about a contest and/or various already submitted entries. FIG. 4 illustrates an example of a simple contest home page 401 that may be provided by administration module 115, according to one embodiment. The contest home page 401 may be accessed, e.g., as a result of clicking on an interface element (such as a web link labeled "View/Enter" in listing 215 of FIG. 2) on a contest manager home page 201. In the depicted embodiment, the contest home page 401 may include a welcome message 407, a prize section 411 describing the prizes that may be won by contestants, an interface element 412 to join the contest, an indication 415 of the time left for submitting entries, a description/rules section 419 describing contestant and voter qualification criteria, and information 423 about the contest producer and/or sponsor. In addition, the contest home page may provide links, implemented for example using HTTP links, to various entries submitted in the contest. In the example shown in FIG. 4, for example, a table 427 listing various contest entries is provided, where each listing in the table comprises a photograph 440 (e.g., photograph 440A-440C) of the contestant, the name 444 of the corresponding entry (e.g., entry name 444A corresponding to photograph 440A, etc.), and an indication 448 (e.g., indication 448A for entry name 444A) of a time at which the entry was submitted. The entries may be displayed according to various ordering criteria: e.g., in one embodiment, the entries with the most votes may be shown at the top of table 427, while in another embodiment, the most recent entries may be displayed first. In some embodiments, the set of entries displayed most prominently may be customized for the viewer: e.g., if contest manager 110 is able to determine a city from which the user is viewing the contest over the Internet, entries from the viewer's city, or from a geographical area near the viewer's city, may be displayed more prominently (e.g., at the top of table 427) than other entries. The photographs 444 and the entry names 448 may each comprise links to web pages for the corresponding contest entries, e.g., by clicking on photograph 444A, a viewer may be led to a web page for the entry corresponding. to name 448A, such as the web page shown in FIG. 5. In some embodiments, the voting system or selection mechanism to be used in the contest may be displayed, explained or illustrated on the contest home page. The interface element 412 to join the contest may lead to one or more other web pages in various embodiments, e.g., for registration as a contestant 160, contest entry creation (such as a web page illustrated in FIG. 6 and described in further detail below), submitting entry fees, etc.

Figure 5:
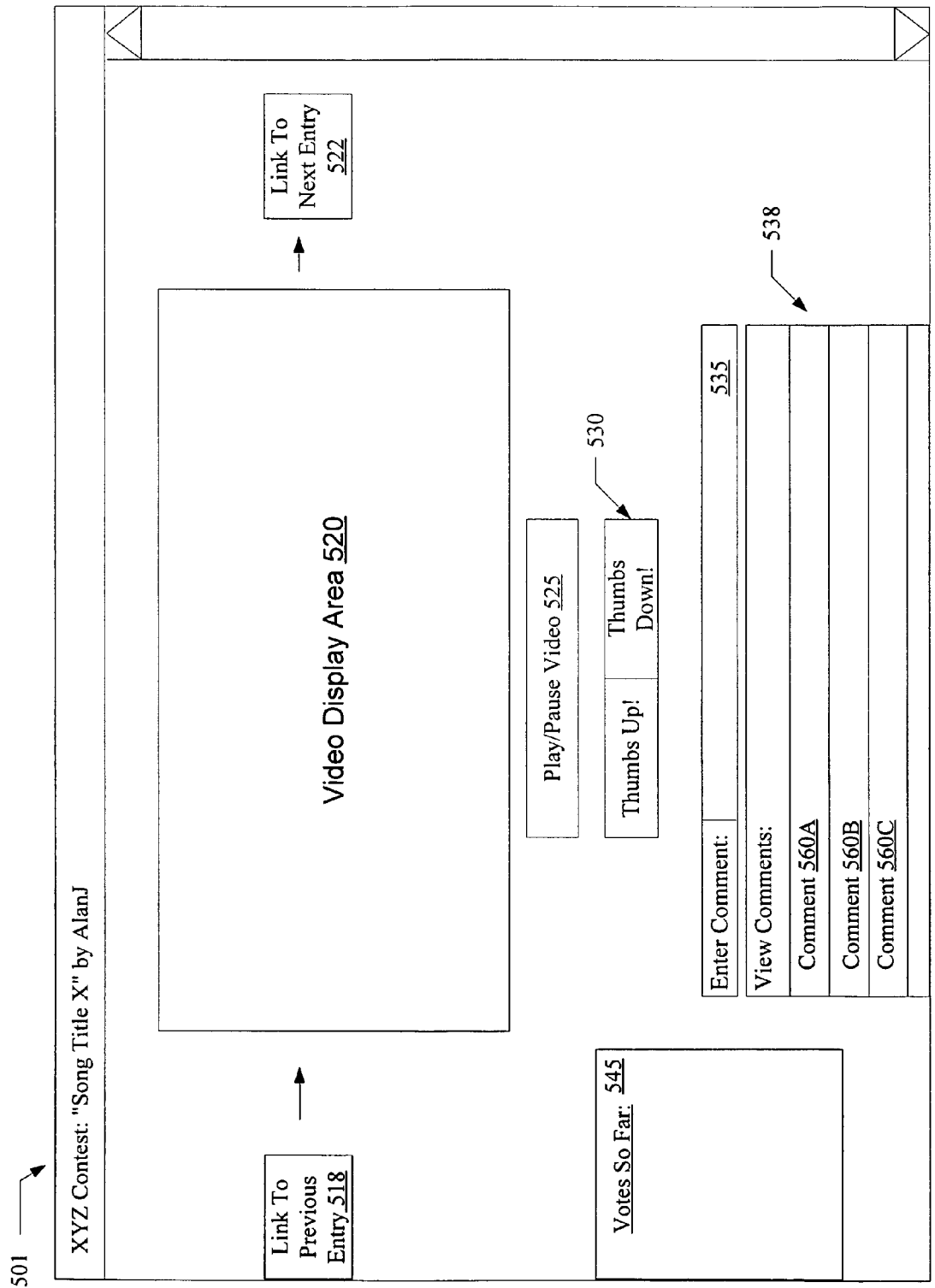
FIG. 5 illustrates an example of a web page displaying details of a particular contest entry, according to one embodiment.

FIG. 5 illustrates an example of a web page. 501 displaying details of a particular contest entry, according to one embodiment. In the illustrated example, the contest entry web page 501 provided by administration module 115 comprises a display window 520 in which the entry may be displayed (e.g., a video entry for a lip sync contest may be displayed in window 520 using any desired web-browser-embedded media player program such as the Windows Media Player from Microsoft Corporation, RealPlayer from Real.com, etc.), as well as a link to a "next entry" 522 and a link to a "previous entry" 518. The "next" and "previous" entries may be selected based on similar criteria as those used to rank entries in table 427 of FIG. 4 described above in some embodiments. In contests with video entries, a still image corresponding to the entry may initially be displayed in the display window 520, and an interface element such as button 525 may be provided to allow a user to play the video or to pause the video after it starts playing. An interface for voting on the entry, such as the "Thumbs Up" (to provide positive feedback or approval) and "Thumbs Down" (to provide negative feedback or disapproval) buttons 530, may also be provided on contest entry web page 501. An interface element such as text area 535 to add a comment corresponding to the entry displayable in window 520 may be provided in some embodiments, and previously submitted comments on the same entry (such as comments 560A-560C in FIG. 5) may be viewable in an interface element such as a table 538 in some embodiments.

In one embodiment, a region 545 of the contest entry web page 501 may display information about already-cast votes, e.g., indicating how many positive votes and/or negative votes have already been cast for the entry. Information about the already-cast votes may be hidden until the current user casts his or her own vote in some embodiments: e.g., region 545 may be invisible or may not be populated with data until after a user uses interface element 530 in such embodiments.

In some embodiments, a display of a contest entry (such as a playback of a video using an interface similar to that shown in FIG. 5) may include one or more advertising elements. In one such implementation, contest manager 110 may be configured to insert an advertisement (e.g., using media manager 125) into an entry, such as a corporate logo in a corner of video display layer 520, a banner occupying a section of the video as background, or a product placement such as a bottle of a beverage sold by the corporation. For example, sophisticated video editing software may be used to insert such advertisements into a video entry, without making it apparent to the average viewer or voter that an original contest entry has been modified. In some implementations, contest manager 110 may obtain permission from a contestant 160 prior to inserting or displaying advertisement information in the contestant's entry; in other implementations, contestants 160 may give contest manager 100 the right to modify their entries as a condition of participation in the contest, and no additional permission may be required for the advertising. In some embodiments, a payment or non-monetary compensation received from an advertiser by the contest manager 110 may be shared with the contestant or contestants whose entries include the corresponding advertising. In one implementation, compensation may be received by contest manager 110 and/or shared with a contestant 160 each time a corresponding contest entry with an included advertisement is viewed—e.g., the number of times the entry is viewed may be tracked and advertising-related payments may be made accordingly. In some embodiments, contestants 160 may include product placements or other advertising-related elements in their original entries: e.g., in a video or photograph contest, contestants may be required to include a reference to a corporation (such as a view of a corporate logo or a product) in the entries they submit.

It is noted that while FIG. 4 and FIG. 5 illustrate simple examples of the kinds of information that may be included within web pages for contests and contest entries respectively in some embodiments, in other embodiments different user interfaces and/or different user interface elements than those shown in FIG. 4 and FIG. 5 may be used. Different interface elements may be provided for voting based on the voting scheme being implemented for the contest; for example, in one embodiment a set of radio buttons may be provided to implement a voting system that uses a 1-to-5 rating. The interface for viewing the contest entry may also differ, depending on the content type of the contest entry: e.g., a high-contrast text interface similar to those used for electronic books (e-books) may be provided for text entries in some embodiments. Prize Management A number of different prize or award management schemes may be implemented by administration module 115 in various embodiments. In some embodiments, for example, an entry fee may be required for each submitted entry, and the prize awarded to the winner or the top-rated contestants may be based at least in part on the total amount collected in the form of entry fees. For example, in one scenario, each entry in a lip sync contest may require a $1 entry fee. If 10,000 contestants participate, thus generating $10,000 in entry fees, 75% of the total entry fees ($7500) may be distributed to the winning contestant or contestants, and 25% ($2500) may be divided among a contest organizer, and/or the service provider responsible for implementing and maintaining contest manager 110. In some embodiments, a contest may be sponsored, e.g., by a corporation, and no entry fees may be charged for at least the first N contestants; instead, the sponsor may be responsible for providing at least a portion of the prize amount. A combination of sponsor-provided funds and entry fees may be used for prize money in one embodiment: e.g., a sponsor may be responsible for providing a minimum prize money amount, the entry fee may be waived for the first N contestants, and any entry fees provided by additional contestants may be added to the sponsor-provided prize money. In some embodiments, contest manager 110 may support paid subscriptions that provide subscribers the right to participate in a specific number of contests: e.g., in a scenario where entering each contest without a subscription costs $1, a $10 annual subscription may permit a user to enter 20 contests during a year, thus reducing the subscriber's effective entry fee for the 20 contests to $0.50 each. In one embodiment a sponsor or organizer of a contest may provide a particular amount of funding into an account set up for a particular contest, e.g., to subsidize a specified number of contest entries. In one such scenario, for example, $5000 may be provided to support the first 5000 entries in a contest, or the first 5000 entries received from first-time contestants (i.e., contestants who have not participated previously in a contest managed by contest manager 110). In some embodiments, a sponsor may provide "credits" to the top N vote-getters in one contest, which may be used to enter other contests: that is, a contestant receiving a credit for doing well in a contest "A" may be given a credit that can be used to enter contest "B" without paying the entry fee for contest "B".

In some embodiments, non-monetary prizes or benefits may be awarded to contest winner, either in addition to or instead of monetary prizes. For example, in some contests, a winning contestant or a set of the highest-ranked contestants may be provided additional exposure on the contest manager's web site (e.g., a photograph or video of the winner may be displayed prominently on the contest manager's Welcome page 201), the winner may be shown or identified in one or more advertisements (either on the Internet or on other media such as radio, television or newspapers), and/or the winner may be provided with contacts to entertainment companies such as radio or television broadcasters, film producers, etc. In one embodiment, contest manager 110 may be linked to an e-commerce engine 140 selling content produced by winning contestants: for example, for a winning contestant, the contest manager's web site may provide links to compact discs, individual song recordings, or videos made by the winning contestant that are available on the e-commerce engine's web site. For increased impact, the links to the e-commerce engine 140 may be displayed within web pages at a number of different levels within the contest manager's web site in some embodiments: e.g., within the web page for a contest entry (such as web page 501 of FIG. 5) submitted by the winner, the home page for a contest in which the winner participated (such as web page 401 of FIG. 4), and/or the home page for the contest manager (such as page 201 of FIG. 2). In one embodiment, as part of a prize or reward offered to a winning contestant, the contest manager 110 may be configured to implement a mechanism to license content (such as songs, song collections, videos, short stories, photographs, etc.) created by the winning contestant, and to provide royalties to the winning contestant.

Prize management details may also be specified as part of the contest creation process, e.g., a contest creator 170 may indicate whether and how prize amounts are to be determined, how many contestants are to be awarded prizes, etc. as part of requests sent to establishment module 110 in some embodiments. As noted earlier, in some jurisdictions contests that distribute monetary or other rewards may be regulated by one or more government authorities, and establishment module 110 may be configured to use rules engine 117 to ensure that no regulations are being violated by the prize distribution scheme requested by a contest creator. It is noted a plurality of contestants may be awarded monetary prizes and/or benefits in some contests: that is, a given contest may not be limited to one or a very small group of winners. For example, in one embodiment, the top 100 vote-getters in a photography contest may each be awarded a camera as a prize.

Unlike in traditional contests in which non-winners typically receive no rewards of any kind, in some contests managed using contest manager 110, large numbers of contestants 160 may be rewarded at least to some extent, e.g., by being allowed to enter subsequent contests with reduced entry fees, having their contest entries viewable by the general public even after the contest ends, allowing viewers to comment on or praise the entries, etc. In one embodiment, randomly selected contestants 160 or contest entries may be publicized or highlighted on the home page of the corresponding contest or the home page of contest manager 110 for specific periods of time, thus providing another reward mechanism for contestants 160 that may not be contest winners.

Voter Rewards, Profiles and Fan Sites

In some embodiments, administration module 120 of contest manager 110 may be configured to implement a voter reward scheme, in which, for example, voters 165 that most accurately predict contest outcomes are provided with monetary or non-monetary rewards. For example, in one embodiment, if a voter 165 successfully votes for the eventual winner of a plurality of contests or a plurality of rounds of a contest, the voter 165 may be provided a prize or may be provided with free publicity or fame (e.g., the voter may be identified as a "top voter" on the contest manager's web site). In another embodiment, administration module 120 may be configured to implement a system of "vote strength", in which not all votes are given equal weight in determining the outcome of a contest: instead, for example, the weight associated with a particular voter's vote may be adjusted based on the success of the voter in predicting the outcome of previous contests or previous rounds within a contest. In one exemplary embodiment, a voter 165 may be identified as a "power" voter because the voter has voted for the winner of at least 80% of the contests in which the voter has cast a vote, and the relative weight of that voter's vote may be increased to 5 (so that each vote cast by the voter in a subsequent contest counts as the equivalent of 5 votes cast by non-power voters).

In one embodiment, contest manager 110 may permit voters 165 to select teams consisting of a plurality of contestants 160. The voters 165 may follow the progress of the members of their selected teams through various rounds of a contest, or through various contests, and the voter whose "team" collectively performs the best (e.g., the team whose members receive the most votes) may be rewarded with a monetary and/or a non-monetary prize. In some embodiments, contest manager 110 may provide an interface or interfaces allowing voters to bet or gamble on contest results, e.g., either using an official currency (such as United States dollars) or using a virtual or artificial currency supported by contest manager 110. In one such embodiment, contest manager 110 may be configured to compute and display the current odds (e.g., 1000 to 1) of a given contest entry being determined the winner of a contest, based on the bets that have been placed on the contest entry so far, and voters 165 may place new bets based on the current odds. Using these and other similar techniques, contest manager 110 may provide incentives for viewers to vote in contests managed by the contest manager, thus increasing viewer loyalty to the contest manager's web sites, which may in turn lead to increased revenue for the organization implementing the contest manager 110 (e.g., due to increases in advertising, sponsorship, contest entry fees, etc.).

In some embodiments, contest manager 110 may be configured to implement a variety of other services to attract and retain additional visitors (e.g., voters 165 and contestants 160) to contest web sites. For example, contest manager 110 may implement a contestant profile system in one embodiment. A contestant profile may comprise, for example, one or more web pages including a variety of information about a particular contestant 160, such as a photograph of the contestant, a list of contest entries submitted by the contestant, a message board comprising comments about the contestant's entries, etc. Contest manager 110 may be configured to provide customizable templates for establishing contestant profiles in one embodiment, and registered viewers of the contest manager's web sites may be permitted to customize profile pages using the templates. In one embodiment, a contestant profile web page may provide an interface (e.g., a form) enabling viewers to add themselves as "fans" or supporters of the contestant, or as a friend or family member of the contestant. In some embodiments, the contest manager 110 may provide viewers with tools (such as easily customizable template web pages) to establish fan clubs (e.g., fan club web sites) for contestants 160. The fan club web sites may support similar functionality as the contestant profiles described above.

Upload Tool For Contest Entry Submission

Figure 6:
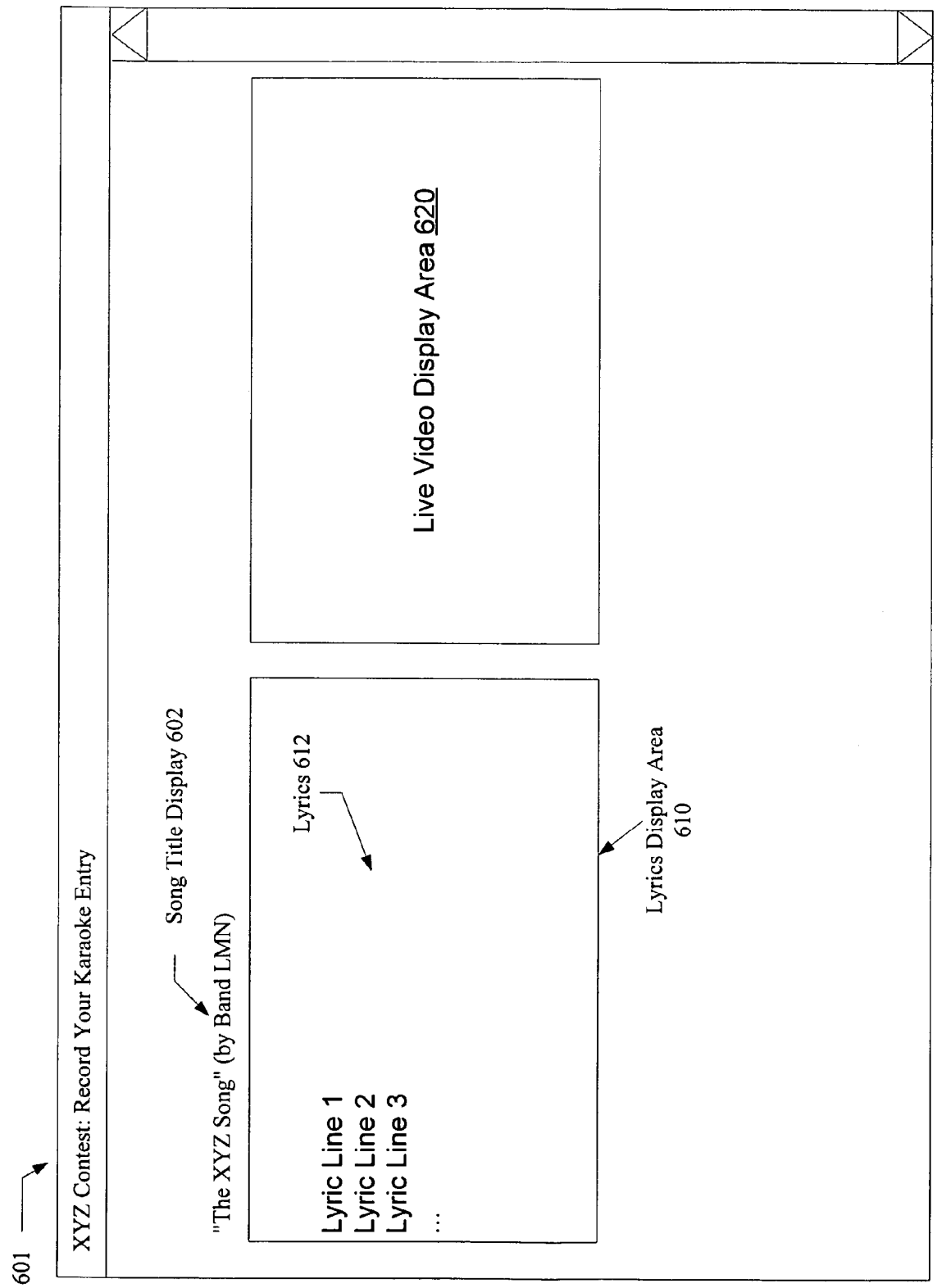
FIG. 6 illustrates an exemplary web page that may be displayed with the help of an upload tool to a contestant during a recording of a karaoke entry for a contest, according to one embodiment.

In some contests where the entries include both audio and video, synchronization between the audio and video elements of an entry may be required, e.g., to ensure that the timing of lip movements of a contestant in a lip sync contest matches the timing of the original singer, or that the singing of a karaoke contestant matches the music being played. In some embodiments, the contest manager 110 (e.g., using administrative module 120 and/or media manager 125) may be configured to assist in synchronization of the various elements of a contest entry. For example, the contest manager 110 may be configured to transmit software modules (which may collectively be referred to herein as an upload tool or tools) to a contestant's client system 150 (such as a personal computer or a laptop) to take control of various recording peripheral devices, such as a microphone and a computer-attached video camera, that are to be used to record a contest entry, and to synchronize input received from the different peripheral devices. For lip sync and/or karaoke contests, the transmitted tool may be configured to play background music and display lyrics with the appropriate timing. FIG. 6 illustrates an exemplary web page 601 that may be displayed with the help of an upload tool to a contestant 160 during a recording of a karaoke entry for a contest, according to one embodiment. As shown, the web page 601 may include a song title display 602, a lyrics display area 610 showing the lyrics 612 of the song for which the karaoke entry is being recorded, and a live video display area 620 in which the video being captured by a camera linked to the contestant's client computer system 150 may be shown as it is being recorded.

The upload tool (which may include an audio capture module separate from a video capture module in some embodiments) transmitted by the contest manager 110 may be installed on a client system 150 the first time that a contest entry is submitted from that client machine, and may be left on the client system 150 after the first entry is submitted in some embodiments, e.g., to avoid retransmission if the client system 150 is later used for submitting additional contest entries. In other embodiments, one or more of the modules of the upload tool may be reinstalled for every entry submission. In one embodiment, contest manager 110 may be configured to automatically update one or more components of the upload tool at a client system 150 when a new version of the modules (e.g., a version with defect fixes and/or enhanced capabilities) becomes available. In various embodiments the upload tool may be configured to capture and/or upload a variety of different types of media: e.g., in one embodiment, the tool may capture still images either directly from a camera, a scanner, or from a storage location (such as a disk or a flash drive) specified by a contestant 160, and may be configurable to create a custom slideshow comprising still photographs from a number of sources. The upload tool may also support synchronization between the slides and music (e.g., either music provided by contest manager 110 or music supplied by the contestant 160) in some embodiments.

In one embodiment, a module or modules of the upload tool provided by the contest manager 110 may be configured to detect the volume setting of speakers and/or microphones being used to create the an audio recording, and to modify the setting as necessary to improve the quality of a contest entry. In another embodiment, one or more modules of the upload tool may be configured to automatically detect bandwidth available for the connection between the client system 150 and the contest manager 110 and may adapt the uploading of contest entries accordingly: for example, if the upload tool detects that insufficient bandwidth is available for an immediate upload, a video or audio contest entry may be temporarily stored on the client system 150, and may be uploaded later. In one embodiment, a module of the upload tool may be configured to automatically detect features or capabilities of a camera linked to the client system 150, and may be configured to adjust the settings of the camera to optimize capture of a contest entry video or still image. The upload tool may comprise one or more plugin modules for a web browser in some embodiments, e.g., modules that may be linked to the executable code of the browser without requiring manual intervention. The upload tool may support a number of other functions in various embodiments, such as the ability to overlay one or more graphic images over each other or over a video recording, the ability to convert media objects from one format to another (e.g., to convert a file in ".avi" (Audio-Video Interleaved) format to an equivalent ".flv" (a format supported by the Macromedia Flash™ program), the ability to combine or "mash" still images using video effects, etc. In some embodiments, the upload tool may comprise a voice analysis module configured to compare a digitized version of a contestant's singing of a song to a digitized professionally recorded version of the song, and provide an analysis of the differences between the two versions—e.g., to help a contestant improve his/her singing. In one embodiment, the upload tool may be configured to provide one or more editing modules for previewing and/or modifying a contest entry at the client system 150 prior to submission. A contestant 160 may use the functionality to make improvements to an entry before submission to contest manager 110 (e.g., the contestant may remove extraneous portions of a video, enhance video portions that may have been captured at a poor quality, change brightness or contrast in photograph contest entries, etc.).

Contest-Related Virtual Communities

In some embodiments, the contest manager 110 may be configured to support the establishment and maintenance of virtual communities associated with contests and/or contestants (e.g., groups of individuals with a shared interest in a particular contest or contestants who are interested in communicating with one another over the Internet). For example, in one embodiment the contest manager 110 may enable viewers/voters to easily establish web logs, so-called "wikis" (a website or similar online resource that allows users to add and edit content without going through a centralized control mechanism), multi-user groups or forums to discuss and/or comment on contests or contestants. The contest manager 110 may also support functionality that informs a particular viewer or voter 165 who indicates a preference for a particular contest, contest entry or contest theme about other viewers with similar preferences: e.g., the contest manager 110 may inform a viewer that "people who liked contest entry "X" also liked contest entry "Y""or "people who liked contestant "A" also liked contestant "B", etc. Viewers with similar interests may be permitted to identify themselves as "friends" of each other on a web site managed by contest manager 110 in some embodiments, and when a particular viewer belonging to such a group of friends visits a contest page, the contest manager 110 may personalize the page using information associated with one or more friends of the viewer. For example, the contest manager may indicate one or more voting choices made by friends of the viewer: e.g., a message such as "N of your friends voted for content entry X" may be displayed. The establishment of virtual communities using these and similar techniques may also help to increase viewer loyalty to the contest manager's web sites, which may in turn result in higher participation levels in contests, increased sponsorships, more advertising revenue, etc.

It is noted that although a variety of web pages corresponding to various aspects of contest management have been illustrated in FIG. 2-FIG. 6, in some embodiments interfaces other than web pages may be implemented by contest manager 110. For example, in one embodiment, contest manager 110 may provide a custom graphical user interface (GUI) that may be installed on client devices 150, and may not require the use of a web browser.

Figure 7:
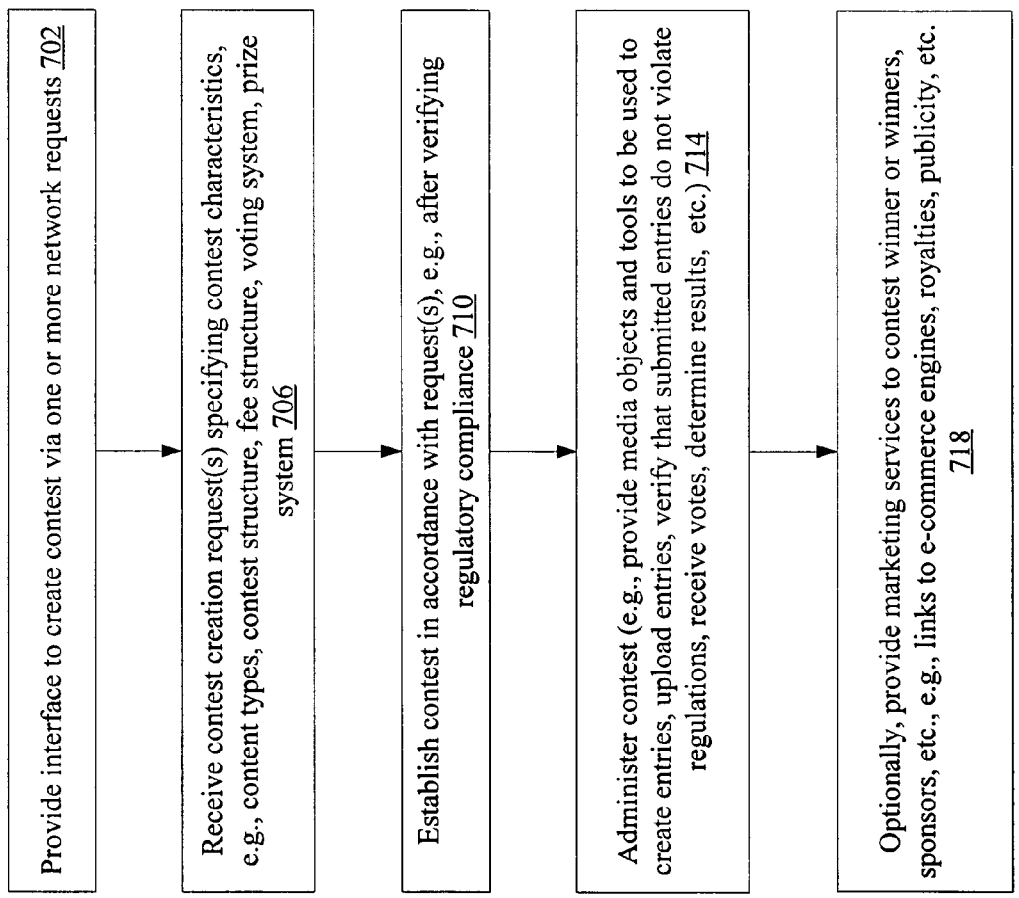
FIG. 7 is a flow diagram illustrating aspects of the operations of a contest manager, according to one embodiment.

FIG. 7 is a flow diagram illustrating aspects of some of the operations of contest manager 110 described above, according to one embodiment. As shown in block 702 of FIG. 7, the contest manager 110 (e.g., using establishment module 115) may be configured to provide an interface (e.g., similar to web page 301 of FIG. 3) allowing contest creators 170 to submit requests for contest creation over a network, such as the Internet. The contest manager 110 may receive contest creation requests submitted using the interface, where the requests specify various characteristics of the contest, such as the content type of contest entries, whether the contest is to be restricted to a designated set of contestants or not, the entry fee, the voting system, the prize system, etc. (block 706). In some embodiments, the contest creation requests may comprise reservation requests to dedicate a desired set of computing, storage and/or networking resources for use in conducting the contest. In response to a contest creation request or requests, the contest manager 110 may establish a contest in accordance with the details specified in the requests (block 710). In some embodiments, the contest manager 110 may be configured to verify, e.g., using rules engine 117, that applicable government regulations are not being violated by the creation of the contest before establishing the contest. As noted above, using the contest manager 110, it may be possible for a contest creator located anywhere in the world to establish a contest potentially open to hundreds of thousands of contestants 160 (also located anywhere in the world) within a few minutes.

After a contest has been established, contest manager 110 may be configured to launch the contest, e.g., a web site comprising one or more web pages similar to web page 401 of FIG. 3 for the contest may be made accessible to contestants 160. The contest manager (e.g., using administration module 120 and media manager 125) may be configured to conduct or administer the contest (block 714). Contest administration may comprise a variety of different types of operations in various embodiments as described above, such as, for example, registering contestants 160, providing media objects (such as karaoke lyrics) to client systems 150 for use by contestants to create contest entries, uploading contest entries, verifying that the entries do not violate government regulations, receiving votes, determining and displaying results, etc.). In some embodiments, the contest manager 110 may also be configured to provide one or marketing functions or services to contest winners or sponsors (block 718). In one embodiment, the contest manager 110 may provide links on one or more of its web pages enabling consumers to purchase compact discs or videos associated with the contest, such as compact discs or videos produced by winners of the contest. In another embodiment, the contest manager may provide links to web pages or sites maintained by corporate sponsors of the contest, e.g., enabling consumers to obtain coupons to be. used to purchase products produced by the sponsors.

Figure 8:
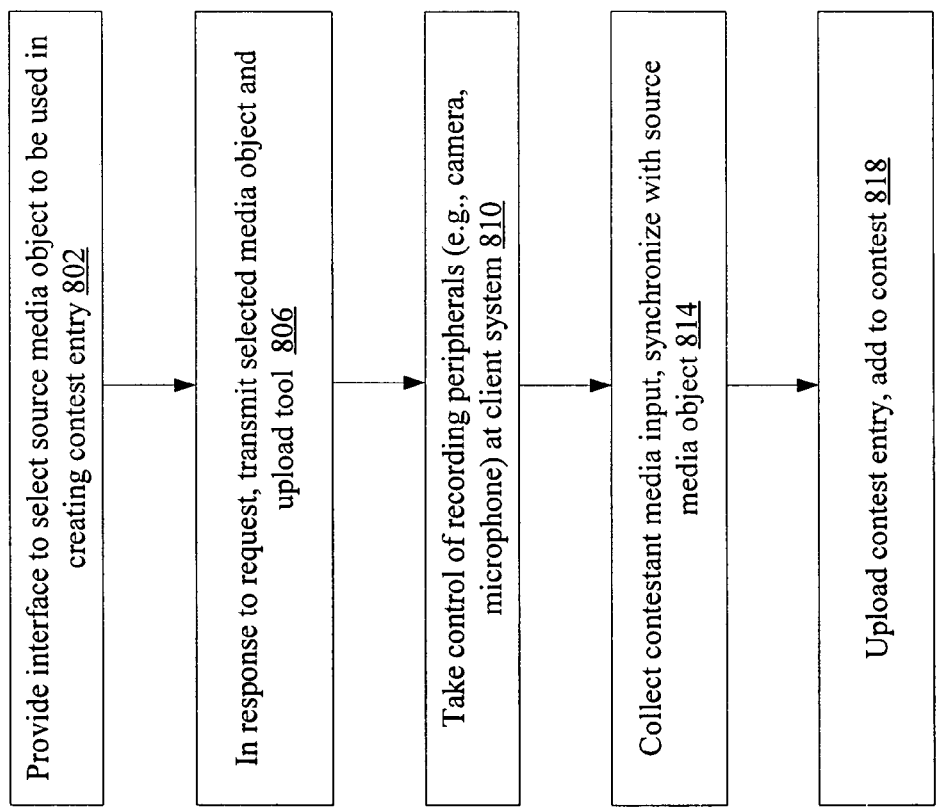
FIG. 8 is a flow diagram illustrating aspects of the operation of a contest manager during contest entry creation and upload, according to one embodiment.

FIG. 8 is a flow diagram illustrating further aspects of the operation of contest manager 110 during contest entry creation and upload, according to one embodiment. As shown in block 802, the contest manager 110 may provide (e.g., via administration module 120 and/or media manager 125) an interface allowing contestants 160 to select a source media object (such as a video recording of a song for a lip sync contest or song lyrics for a lip sync contest) to be used to create a contest entry. For example, the contest manager may display a library of available media objects appropriate for the contest in which a contestant 160 wishes to participate. In response to a request for a selected media object, the contest manager 110 may transmit the media object and one or more modules of an upload tool to a client system 150 used by the contestant 160 (block 806). In some embodiments, the contest manager 110 may be configured to determine whether the client system 150 already has the necessary upload tool modules installed, and may avoid transmitting the modules if they are already installed at the client system 150. One or more modules of the upload tool may be configured to take over recording peripheral devices such as a microphone or a camera at the client system 150 for the purpose of creating a contest entry (block 810). Media input provided by the contestant (such as voice or video) may be collected and/or synchronized with the source media object by the upload tool (e.g., the timing of a song's lyrics may be more closely correlated with the lip movements of the contestant captured by a video camera) (block 814). The contest entry may then be uploaded and added to the contest (block 818), e.g., by displaying it on a web page similar to that shown in FIG. 5 that allows voters 165 to vote or comment on the entry.

Figure 9:
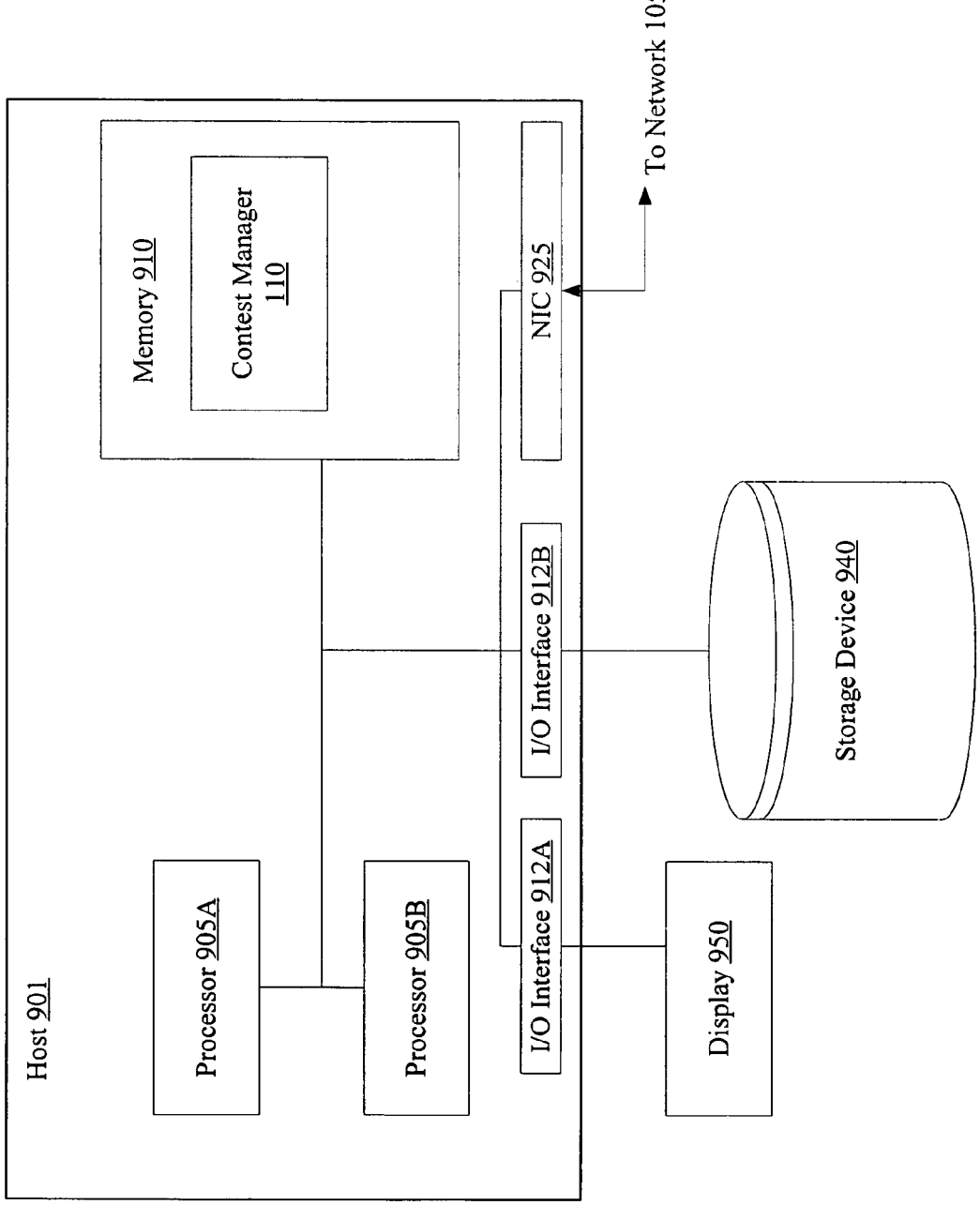
FIG. 9 is a block diagram of a computer host that may be used to perform part or all of the functionality of a contest manager according to one embodiment.

FIG. 9 is a block diagram of a computer host 901 that may be used to perform part or all of the functionality of contest manager 110 (and/or may be used as a client system 150) according to one embodiment. As shown, host 901 may include one or more processors 905, such as processors 905A and 905B. In various embodiments, processors 905 may be implemented using any desired architecture or chip set, such as the SPARC™ architecture from Sun Microsystems or the x86-compatible architectures from Intel Corporation, Advanced Micro Devices, etc. Program instructions that may be executable to implement the functionality of the contest manager 110 described above may be partly or fully resident within a memory 910 at a given point in time, and may also be stored on a storage device 940 (e.g., a storage device included within storage 130 of FIG. 1). Memory 910 may be implemented using any appropriate medium such as any of various types of RAM (e.g., DRAM, SDRAM, RDRAM, SRAM, etc.). In addition to processors 905 and memory 910, host 901 may also include one or more I/O interfaces 912, such as I/O interface 912A to a display device 950, and I/O interface 912B providing access to storage devices 940, one or more network interface cards (NICs) 925 providing access to a network, and the like. Any of a variety of storage devices 940 may be used to store the instructions as well as data for contest manager 110 in different embodiments, including any desired type of persistent and/or volatile storage devices, such as individual disks, disk arrays, tape devices, optical devices such as CD-ROMs, CD-RW drives, DVD-ROMs, DVD-RW drives, flash memory devices, various types of RAM and the like. One or more storage devices 940 may be directly coupled to host 901 in some embodiments (e.g., using the Small Computer Systems Interface (SCSI) protocol), or may be accessible over any desired storage interconnect such as iSCSI (internet SCSI), a fiber channel fabric or storage area network (SAN) in other embodiments. A storage device 940 may include holographic media in some embodiments. In addition to components of contest manager 110, memory 910 and/or storage devices 940 may also store operating systems software and/or software for various other applications in various embodiments. In some embodiments, the component modules of contest manager 110 may be distributed across multiple hosts 901, or may be replicated at a plurality of hosts 901. In one embodiment, part or all of the functionality of contest manager 110 may be implemented via one or more hardware devices (e.g., via one or more Field Programmable Gate Array (FPGA) devices) or in firmware.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
one or more processors; and
a memory coupled to the processors, wherein the memory stores program instructions executable by the one or more processors to implement a contest manager configured to:
collect an entry fee corresponding to each entry of a plurality of entries submitted by a plurality of entrants for a contest over a network each entry including content related to the contest;
provide a prize to a winning entry of the contest based at least in part on a total amount of entry fees collected for the contest;
license the content of the winning entry to provide royalties to the entrant of the winning entry; and
provide consolation prizes to the plurality of entrants of non-winning entries.

2. The system as recited in claim 1, wherein the network comprises at least a portion of the Internet.

3. The system as recited in claim 1, wherein the contest manager is configured to establish the contest in accordance with a request received over the network, wherein the request specifies the entry fee.

4. The system as recited in claim 1, wherein the prize comprises a non-monetary component.

5. The system as recited in claim 1, wherein the contest manager is further configured to collect a sponsorship amount for the contest from a sponsor, and wherein the prize is based at least in part on the sponsorship amount.

6. The system as recited in claim 1, wherein the contest manager is further configured to reduce the contest entry fee for a plurality of contest entries based at least in part on a sponsorship amount received for the contest from a sponsor.

7. A system, comprising:
one or more processors; and
a memory coupled to the processors, wherein the memory stores program instructions executable by the one or more processors to implement a contest manager configured to:
provide one or more interfaces allowing a plurality of voters to bet on a plurality of contest results;
determine a respective winner of each contest of a plurality of contests based at least in part on votes received over a network from the plurality of voters;
identify a particular voter of the plurality of voters who voted for the winners of two or more contests of the plurality of contests;
adjust a weight associated with a vote of the particular voter based on the success of the particular voter in predicting the outcome of previous contests or rounds within a contest such that the vote of the particular voter has greater or lesser value compared to votes belonging to other voters of the plurality of voters; and
provide a reward to the particular voter.

8. The system as recited in claim 7, wherein the reward comprises a display of information associated with the particular voter on a web site.

9. The system as recited in claim 7, wherein the reward comprises a change in a vote strength for a vote submitted by the particular voter for another contest.

10. A tangible, computer readable storage medium comprising program instructions, wherein the instructions are computer-executable to implement a contest manager configured to:
collect an entry fee corresponding to each entry of a plurality of entries submitted by a plurality of entrants for a contest over a network, each entry including content related to the contest;
provide a prize to the entrant of a winning entry of the contest based at least in part on a total amount of entry fees collected for the contest;
license the content of the winning entry to provide royalties to the entrant of the winning entry; and
provide consolation prizes to the plurality of entrants of non-winning entries.

11. The storage medium as recited in claim 10, wherein the network comprises at least a portion of the Internet.

12. The storage medium as recited in claim 10, wherein the contest manager is configured to establish the contest in accordance with a request received over the network, wherein the request specifies the entry fee.

13. The storage medium as recited in claim 10, wherein the prize comprises a non-monetary component.

14. The storage medium as recited in claim 10, wherein the contest manager is further configured to collect a sponsorship amount for the contest from a sponsor, and wherein the prize is based at least in part on the sponsorship amount.

15. The storage medium as recited in claim 10, wherein the contest manager is further configured to reduce the contest entry fee for a plurality of contest entries based at least in part on a sponsorship amount received for the contest from a sponsor.

16. A tangible, computer readable storage medium comprising program instructions, wherein the instructions are computer-executable to implement a contest manager configured to:
provide one or more interfaces allowing a plurality of voters to bet on a plurality of contest results.,
determine a respective winner of each contest of a plurality of contests based at least in part on votes received over a network from the plurality of voters;
identify a particular voter of the plurality of voters who voted for the winners of two or more contests of the plurality of contests;
adjust a weight associated with a vote of the particular voter based on the success of the particular voter in predicting the outcome of previous contests or rounds within a contest such that the vote of the particular voter has greater or lesser value compared to votes belonging to other voters of the plurality of voters; and
provide a reward to the particular voter.

17. The storage medium as recited in claim 16, wherein the reward comprises a display of information associated with the particular voter on a web site.

18. The storage medium as recited in claim 16, wherein the reward comprises a change in a vote strength for a vote submitted by the particular voter for another contest.

19. A computer-implemented method, comprising:
collecting an entry fee corresponding to each entry of a plurality of entries submitted by a plurality of entrants for a contest over a network, each entry including content related to the contest;
providing a prize to the entrant of a winning entry of the contest based at least in part on a total amount of entry fees collected for the contest;
licensing the content of the winning entry to provide royalties to the entrant of the winning entry; and
providing consolation prizes to the plurality of entrants of non-winning entries.

20. The method as recited in claim 19, further comprising:
establishing the contest in accordance with a request received over the network, wherein the request specifies the entry fee.

21. The method as recited in claim 19, wherein the prize comprises a non-monetary component.

22. The method as recited in claim 19, further comprising:
collecting a sponsorship amount for the contest over the network from a sponsor;
wherein the prize is based at least in part on the sponsorship amount.

23. The method as recited in claim 19, further comprising:
reducing the contest entry fee for a plurality of contest entries based at least in part on a sponsorship amount received for the contest from a sponsor.

24. A computer-implemented method, comprising:
providing one or more interfaces allowing a plurality of voters to bet on a plurality of contest results;
determining a respective winner of each contest of a plurality of contests based at least in part on votes received over a network from the plurality of voters;
identifying a particular voter of the plurality of voters who voted for the winners of two or more contests of the plurality of contests;
adjusting a weight associated with a vote of the particular voter based on the success of the particular voter in predicting the outcome of previous contests or rounds within a contest such that the vote of the particular voter has greater or lesser value compared to votes belonging to other voters of the plurality of voters; and
providing a reward to the particular voter.

25. The method as recited in claim 24, wherein the reward comprises a change in a vote strength for a vote submitted by the particular voter for another contest.

* * * * *